(12) United States Patent
Borve et al.

(10) Patent No.: US 7,056,987 B2
(45) Date of Patent: Jun. 6, 2006

(54) PROCESS FOR PREPARING CROSS-LINKED POLYOLEFINS

(75) Inventors: Kjetil Borve, Tjodålying (NO); Keith Redford, Hagan (NO); Aage Stori, Oslo (NO)

(73) Assignee: Borealis Technology OY, Porvoo (FI)

( * ) Notice: Subject to any disclaimer, the term of this patent is extended or adjusted under 35 U.S.C. 154(b) by 0 days.

(21) Appl. No.: 10/487,646

(22) PCT Filed: Aug. 31, 2001

(86) PCT No.: PCT/EP01/10082

§ 371 (c)(1),
(2), (4) Date: Oct. 1, 2004

(87) PCT Pub. No.: WO03/020815

PCT Pub. Date: Mar. 13, 2003

(65) Prior Publication Data

US 2005/0038200 A1 Feb. 17, 2005

(51) Int. Cl.
 C08C 19/22 (2006.01)
 C08C 19/04 (2006.01)
(52) U.S. Cl. ........................ 525/374; 525/387; 525/376; 525/27; 525/25; 525/105; 525/106
(58) Field of Classification Search ................ 525/387, 525/376, 374, 27, 25, 105, 106, 194
 See application file for complete search history.

(56) References Cited

U.S. PATENT DOCUMENTS 3,298,975 A 1/1967 Field et al.
4,006,283 A * 2/1977 MacKenzie, Jr. et al. ... 525/387
5,977,271 A * 11/1999 McKay et al. ............... 526/170

FOREIGN PATENT DOCUMENTS

| EP | 0181637 | 5/1986 |
| EP | 0370735 | 5/1990 |
| GB | 1080619 | 7/1966 |
| WO | WO 00/78861 | 12/2000 |
| WO | WO 00/78861 A1 * | 12/2000 |
| WO | WO 01/66632 | 9/2001 |
| WO | WO 01/66632 A1 * | 9/2001 |

OTHER PUBLICATIONS

International Search Report for PCT/EP01/10082 mailed Jul. 17, 2002.
Hernandez et al., "Different curing systems for Ethylene-Propylene elastomer," Rubber Chemistry and Technology 65(5): 869-878 (1992).

* cited by examiner

Primary Examiner—Ling-Sui Choi
(74) Attorney, Agent, or Firm—McDonnell Boehnen Hulbert & Berghoff LLP

(57) ABSTRACT

The present invention refers to a process for preparing cross-linked polyolefins, comprising the steps of adding a diazido compound of the formula (I) N=N=N—X—R—X—N=N=N wherein R represents an aryl, alkyl or aralkyl group having 3 to 20 carbon atoms and X stands for —CO—, —O—CO— —$SO_2$—, —$PO_2$—, —$PO_3$—, or —Si (=O)—, and a peroxide compound of the general formula (II) $R_1$—$X_1$—OO—$X_2$—$R_2$ wherein $R_1$ and $R_2$ are the same or different and represent hydrogen, an aryl, alkyl or aralkyl group having 3 to 20 carbon atoms and optionally comprising further peroxide groups, wherein one of $R_1$ and $R_2$ can form a ring, and $X_1$ and $X_2$ are the same or different and stand for a direct bond, —$CO_2$— or —CO— to a polyolefin in powder or pellet form; mixing the product to obtain a mixture; extruding the mixture in an extruder at a temperature above the decomposition temperature of the diazido compound of formula (I) and of the peroxide compound of formula (II).

29 Claims, 1 Drawing Sheet

Figure 1 - HB120J with azido and peroxide
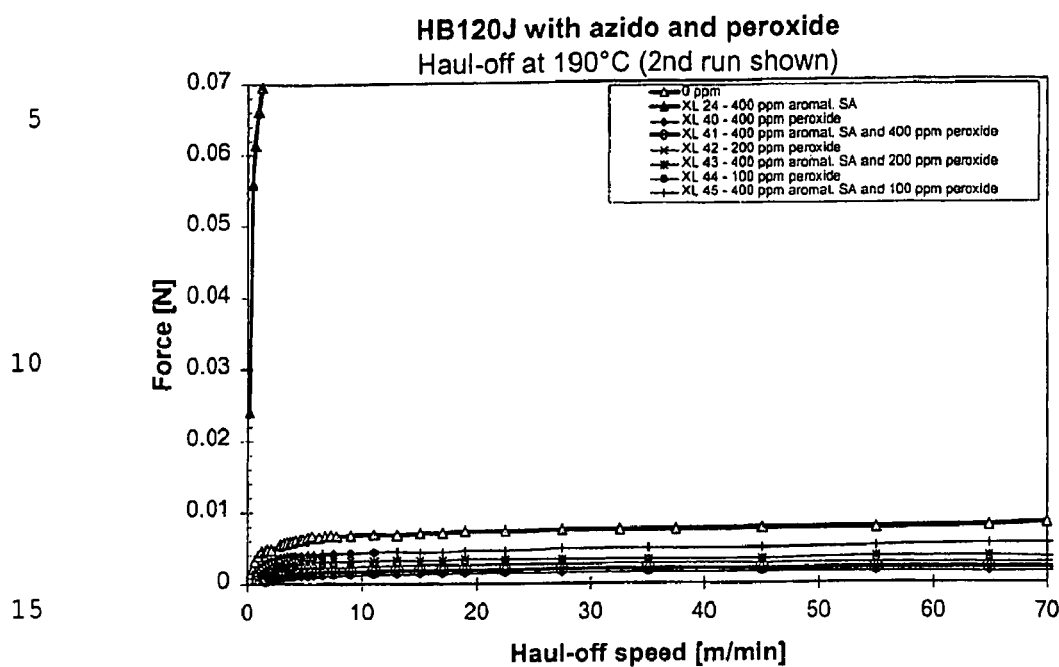
Figure 2 - HB120J with azido and peroxide
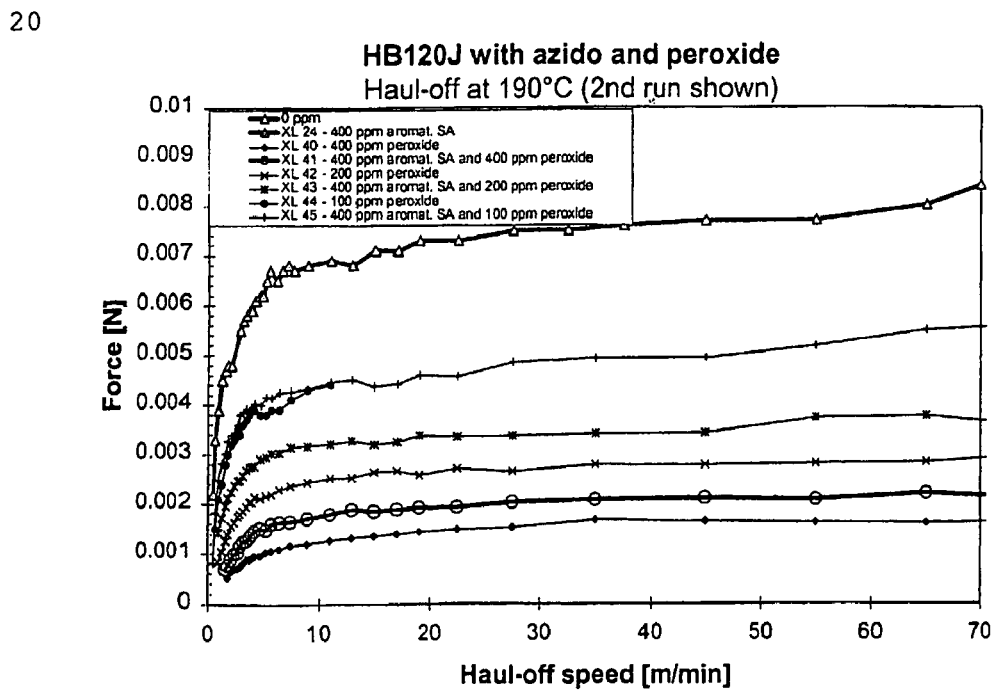

PROCESS FOR PREPARING CROSS-LINKED POLYOLEFINS

The present invention relates to a process for preparing cross-linked polyolefins having an improved melt strength, melt processability and for controlling the viscosity of polyolefins, in particular polypropylene, polyethylene, copolymers and mixtures thereof.

In the state of art, some processes for modifying the viscosity of polyolefins, in particular polypropylene, have been proposed. In said processes, use is mainly made of free radical chemistry. Using said free radical chemistry means that, by radiating polymers with high energy radiation, random scission of bonds has been caused by cleaving the C—H-bond on the main chain leading to reactive radicals. A similar process made use of inorganic or organic peroxides leading also to secondary or tertiary radicals. Both methods rely on the random combination of a so-called main chain radical to crosslink to yield long chain branching. Unfortunately, there is a competition between the desired branching, or grafting, reaction and the cleavage of the main chain by chain scission. It has been observed that at higher temperatures a chain scission was the main reaction leading to a number of by-products including polymers having a shortened main chain.

As the viscosity modification of polyolefins by crosslinking reactions leads to modified olefins which are superior in their properties for blow-molding and foaming, there is a need for an improved process for preparing said cross-linked polymers by which the disadvantages mentioned above are avoided.

The inventors of the present invention surprisingly found that the use of aliphatic or aromatic diazido-compounds in combination with a peroxide compound in the extrusion process of polyolefins leads to crosslinked polymers which exhibit superior viscosity properties, like improved melt strength and melt processability.

There have been some proposals in the state of art to use diazido compounds in combination with polyolefins. For example, GB-1080619 refers to a process for producing several compositions from polymers and/or copolymers of aliphatic olefins which comprises incorporating into the polymer a hydrated salt of a group Ia or IIa metal and heating the resulting mixture to a temperature sufficient to release the hydrated water steam and to blow the polyolefins. According to said document, a chemical blowing agent is preferably incorporated into the polyolefin in order to further improve the foaming properties of the polyolefin foam. In addition to said blowing agents, the use of an azido crosslinking agent is described as a preferred measure for the production of cellular polyolefin compositions having a specific density as low as 20 lbs./cu.ft., as the use of said diazido compounds enables the production of a finer and more uniform cell structure and leads allegedly to a much higher percentage of closed cells. It is the object of said document to improve the properties of the steam blown foam.

A similar solution has been proposed in U.S. Pat. No. 3,298,975, by the same applicant as GB-1080619. According to the disclosure thereof, a method for preparing shaped articles from expandable pellets is described, said pellets having a high impact strength and being free from weld seams between the particles and hence, free from fractures at the welds. The process comprises the steps of partially filling a mold for the desired shaped article with partially expanded pellets comprising a mixture of stereoregular polypropylene, a blowing agent and a poly(sulfonazide) as crosslinking agent, closing and heating said mold to a temperature above the softening temperature of said pellets, said temperature being sufficient to release the gas from the blowing agent to cause the pellets to expand and fill the mold, to complete the crosslinking reaction and to fuse the expanded pellets into an integral cellular structure. The poly(sulfonazide) compounds described in said document are largely the same as mentioned in the above GB-reference.

Furthermore, DE-OS-2118771 describes a process for preparing light-curable polymers containing curable groups in the side chains, said groups being bound by urethane linkages. These curable groups comprise carbonylazido or sulfonylazido functionalities which are decomposed under the influence of light and lead to a network-like polymer structure.

None of the above references however, discloses that organic diazido-compounds in combination with a peroxide compound can be used for controlling the viscosity, melt strength and melt processability of polyolefins, in particular polypropylene and polyethylene, by crosslinking the polymer chains together with providing a controlled chain scission to compliment the cross-linking reaction.

According to the findings of the inventors, the bifunctional azido compound can be added to the polyolefin in such a way as to guarantee good solution or dispersion, i.e., adding the bifunctional azido compound to the polyolefin followed by mixing to obtain a uniform mixture. The polyolefin resins may be used in the form of pellets or as powder, preferably as a powder. The powder may be milled granules or corresponding material, or it may be the polymer substance as obtained from a polymerisation reactor, stabilised or not. Said mixture is then extruded or blow-molded at a temperature above the decomposition temperature of the bifunctional azido compound. Crosslinking of the polymer-chains can be observed as a result of the reaction of one end of the azido compound with one polymer chain and the other end with another polymer chain.

The inventors found out that the application of polyolefins being cross-linked according to invention to processes requiring enhanced melt strength is of much greater importance as the melt strength and the melt processability is the most important of the Theological characteristics for the purpose of further polymer processing. Such processing includes, for example, foaming, blow-molding, blow-film extrusion, thermo-forming and extrusion coating. In the former, an enhanced melt strength contributes not only to higher retention of gas bubbles in the resulting foamed polymer, but also to an improved morphology and regularity in the resulting cell structure. In the latter, an enhanced melt strength together with an improved melt processability results in a uniform wall thickness in high volume structures, for example bottles for consumer products, manufactured by vacuum-stretching a molten polyolefin extrudate against the interior of a mold. A higher uniformity in wall thickness leads to reduction in the number of weak regions in the resulting product and, under conditions requiring high degrees of stretching, for example for very large wide containers, a reduction of the amount of polymer tearing during the molding process.

The present invention is therefore directed to a process for preparing cross-linked polyolefins having an improved melt strength and melt processability, comprising the steps of:

a) adding a diazido compound of the formula (I)

$$N=N=N-X-R-X-N=N=N \qquad (I),$$

wherein R represents an aryl, alkyl or aralkyl group having 4 to 20 carbon atoms and X stands for —CO—, —O—CO— —SO$_2$—, —PO$_2$—, —PO$_3$— or —Si(=O)—; and a peroxide compound of the general formula (II)

  (II)

wherein R$_1$ and R$_2$ are the same or different and represent hydrogen, an aryl, alkyl or aralkyl group having 3 to 20 carbon atoms and optionally comprising further peroxide groups, wherein one of R$_1$ and R$_2$ is not hydrogen and wherein R$_1$ and R$_2$ can form a ring, and X$_1$ and X$_2$ are the same or different and stand for a direct bond, —CO$_2$— or —CO—, to a polyolefin in powder or pellet form, wherein the ratio of the diazido compound to the peroxide compound is within the range of 0,25 to 4, preferable 1 to 4, particularly preferable 1 to 1;

b) mixing the components of step a) to obtain a mixture;

c) extruding the mixture obtained in step b) in an extruder at a temperature above the decomposition temperature of the diazido compound of formula (I) and above the decomposition temperature of the peroxide compound of formula (II).

The inventors surprisingly found that, by carrying out the process of the present invention, polyolefins can be obtained which show significant different properties with respect to melt rheology, when compared to the base polymer. In particular, increases in melt strength, elongational viscosity, melt processability and die swell have been observed. Thereby, the increase in viscosity improves the properties of the polyolefins which are, for example, to be blow-molded.

The inventors found that the diazido compound of the general formula I or mixtures thereof should be preferably limited to medium-sized diazido compounds. This might result from the fact that possible side reactions become a problem due the possibly reduced reactivity of the radical if the carbon backbone of the diazido compound is too large. Therefore, diazido compounds or mixtures thereof are preferred, wherein the diazido compound is of the formula (I):

N=N=N—X—R—X—N=N=N  (I), wherein R represents —(CH$_2$)$_n$—R$_1$—(CH$_2$)$_n$— wherein R$_1$ represents an aryl or polyaryl, wherein aryl can also be substituted by branched or linear C1 to C6 alkyl, or an (CH$_2$)$_w$ group, w being 3 to 6, n is 0, 1 or 2 and X stands for —SO$_2$—, —O—CO— or —CO—; and particularly preferred are diazido compounds of formula N$_3$—SO$_2$—R$_2$—SO$_2$—N$_3$ wherein R$_2$ represents an aryl or an alkyl group having 3 to 8 carbon atoms.

In the above formula, aryl group or polyaryl group, wherein aryl can also be substituted by branched or linear C1 to C6 alkyl, stands for an 1,3-benzo-, 1,3'-biphenyl-ring, 1,4-benzo-, 1,4'-biphenyl-ring, which may be substituted by branched or linear C1 to C6 alkyl.

Most preferred are the compounds 1,6-di(sulfonazido)-hexane and 1,3-di(sulfonazido)-benzene as represented below.

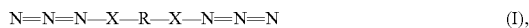

The diazido-compound can be used preferably in the form of a solution in a solvent like a ketone, preferably acetone and usually in an amount of 5 to 25000 ppm, preferably 10 to 10000, more preferably 25 to 5000, even more preferably 50 to 800 and most preferably 50 to 400 ppm related to the amount of the polyolefin.

The inventors found that the peroxide compound of the general formula II or mixtures thereof should be preferably limited to peroxide compounds which decompose into free radicals capable of abstracting hydrogen atoms from the polyolefin backbone. Furthermore, these processes must occur in the polymer melt at high temperatures of approximately 130 to 300° C. requiring only short reaction times of a few minutes.

Therefore, peroxide compounds or mixtures thereof are preferred, wherein the peroxide compound is of the general formula (II)

  (II)

wherein R$_1$ and R$_2$ are the same or different and represent hydrogen, an aryl, alkyl or aralkyl group having 3 to 20 carbon atoms and optionally comprising further peroxide groups, wherein one of R$_1$ and R$_2$ is not hydrogen and wherein R$_1$ and R$_2$ can form a ring, and X$_1$ and X$_2$ are the same or different and stand for a direct bond, —CO$_2$— or —CO—.

More preferred are the compounds wherein neither R$_1$ nor R$_2$ is hydrogen since hydroperoxides show a higher tendency to give side reactions like ionic decomposition and accordingly they are not suited for hydrogen abstraction. Most preferred are peroxide compounds which decompose into methyl, phenyl, t-butyloxy, cumyloxy, and benzoyl or substituted benzoyl radicals. These radicals are very effective in hydrogen abstraction. There is a correlation between the half-life of a radical derived from a given peroxide and the suitability of said peroxide compound in chain scission processes with respect to the thermal conditions. For example, peroxyesters and peroxycarbonates provide their highest hydrogen abstraction capability at lower temperatures of about 130° C. whereas alkyl/aryl peroxides are preferred at higher temperatures of about 200–250° C. Faster hydrogen abstraction occurs with free radicals of lower stability and increased reactivity, which corresponds to less discriminating radical behaviour. Methyl radicals are more reactive than other primary alkyl radicals and are about as reactive as alkoxyl radicals. Therefore, methyl radicals and alkoxyl radicals are preferred for chain scission reactions.

Further preferred are organic peroxide compounds. Any organic peroxide having a half life time of less than 1 minute at temperatures in the range of 100° C. to 300° C., preferably in the range of 160° C. to 250° C. can be used. Also for practical and for safety reasons, the peroxide as supplied should preferably be possible to be handled at ambient temperature as it can be seen from the information from supplier. This defines in practice the lower limit for the half life time of the peroxide. Furthermore the peroxide should preferably be soluble in an appropriate solvent, for example isododecane, or diluted in some other manner, for example in porous PP powder.

Most preferred is the peroxide compound 2,5-dimethyl-2,5-di-(t-butylperoxy)-hexane as represented below.

(CH$_3$)$_3$C—OO—C(CH$_3$)$_2$—(CH$_2$)$_2$—C(CH$_3$)$_2$—OO—C(CH$_3$)$_3$

The peroxide compound can be used usually in an amount of 5 to 10000 ppm, preferably 25 to 5000, more preferably 25 to 1000 ppm related to the amount of the polyolefin.

The polyolefin to be used in the inventive method is preferably a polypropylene, polyethylene, a copolymer or a mixture thereof, including all types of propylene and ethylene polymers such as propylene or ethylene homopolymers and copolymers, as well as blends and alloys containing polypropylene(s) or polyethylene(s) as the major part. The polyolefin is preferably used in the form of a powder, pellets or molten form, the powder being preferred in order to obtain a homogeneous mixture with the diazido compound.

Particularly preferred polyolefins are selected from the group comprising polypropylene and polyethylene homopolymers; copolymers of propylene with ethylene, containing from 0.1 to 50% by weight of ethylene; copolymers of ethylene with the monomers propylene, hexene, and/or octene, containing from 0.1 to 50% by weight of the mentioned monomers; blends of polypropylene with polyethylene such as high density polyethylene (HDPE), low density polyethylene (LDPE), linear low density polyethylene (LLDPE); blends of polyethylene with polyethylene such as high density polyethylene (HDPE), low density polyethylene (LDPE), linear low density polyethylene (LLDPE); ethylene propylene rubbers (EPDM or EPR); and alloys of polyethylene or polypropylene with another thermoplastic polymer selected from the group comprising polyamides (PA), polyesters (PET or PBT), polycarbonates (PC), and polystyrene (PS). Polypropylene or polyethylene blends may contain the second component in an amount from 0.1 to 50% by weight based on the weight of the polymer composition. The polypropylene or polyethylene, or main polypropylene or main polyethylene component, should have a melt flow index from 0.01 to 5000 g/10, preferably 0.2 to 500 g/10 min (determined at the conditions 230° C./2.16 according to ASTM D 1238).

Although various polyolefins can be used in the process according to the present invention, the polyolefin is preferably polypropylene, polyethylene, a copolymer of propylene and ethylene, a copolymer of propylene and/or ethylene with at least one of methacrylate, methyl methacrylate, butyl methacrylate, vinylacetate, or a mixture thereof.

An extrudate obtained according to the process of the invention can be used for the preparation of shaped articles, in particular by blow-molding of large articles. Due to the increased viscosity and melt strength together with the improved melt processability compared to the base polymers without crosslinking, the blow-molding forms can be uniformly filled and homogenous and uniform articles can be obtained.

The shaped or moulded articles prepared according to the inventive process can be used for preparing automotive parts such as bumper parts, dashboards, door panels, head liners, boot inlays etc. and for packaging purposes.

In addition, the inventors have also found that the principle of the process of the present invention can also be used for foaming polyolefins in the presence of a blowing agent which can be selected from physical blowing agents selected from nitrogen, carbon dioxide, an aliphatic organic solvent having 3 to 10, preferably 3 to 8 carbon atoms and chemical blowing agents like citric acid, inorganic carbonates, azodicarbonamide and other agents known in the art as blowing agents or mixtures thereof. The kind of the blowing agents is not decisive as far as the vapour pressure at the processing temperature is sufficient to blow the foam.

The aliphatic organic solvent having 3 to 10, preferably 3 to 8 carbon atoms or mixtures thereof are preferred as a physical blowing agent. Propane, Butane, N-pentane, n-hexane, branched isomers or mixtures thereof are particularly preferred as physical blowing agents.

When using said lower alkanes as physical blowing agents, a uniform closed cell structure can be obtained wherein the cell gas is mainly comprised of said blowing agent and serves for good thermal insulation properties of the formed article.

The following examples illustrate the process of the present invention and provide data of the physical properties of the extrudates prepared according to the process of the invention.

PREPARATION EXAMPLES

In the extrusion tests following below, the aromatic disulfonyl azide benzene-1,3-disulfonyl azide and the peroxide compound 2,5-dimethyl-2,5-di-(t-butylperoxy)-hexane are used. These compounds have been tested in various concentrations relative to the polyolefin polypropylene. The set of samples were extruded at 180° C. on a Clextral BC21 extruder. Preparation of Hexane 1,6-disulfonyl azide Hexane 1,6-disulfonic acid. 1,6-dibromohexane (25 ml, 0.16 mol) and sodium sulfite (45.5 g, 0.36 mol) in water (85 ml) were heated at reflux for 16 h. The mixture was then filtered whilst hot and the filtrate was concentrated under reduced pressure to yield the hexane 1,6-disulfonic acid (39.3 g, 0.16 mol) which was used without further purification. The diacid was ground into a fine powder and powdered phosphorus pentachloride (84 g, 0.4 mol) was added carefully. After an initial vigorous reaction, the mixture was heated with mechanical stirring at 110° C. for 90 min., yielding a mustard coloured solution. On cooling the mixture was cautiously triturated with ice/water and the resultant solid filtered off. The solid was washed with water and dried under vacuum to afford the disulfonyl chloride hexane compound as a cream yellow solid (38.6 g, 96%). This material was used without purification in the next step.

To sodium azide (20 g, 0.30 mol) in water (85 ml) was added dropwise a yellow solution of hexane 1,6-disulfonyl chloride (38.6 g, 0.15 mol) in acetone (255 ml) at 0° C. Upon addition of half of the solution a white precipitate was seen and upon complete addition a red coloured solution was afforded. After stirring for 1 h at <5° C. the precipitate was filtered off and the solid washed with cold water to yield the diazide as fine white needles (25 g, 62%) (NB azides can be destroyed in a careful manner by the addition of sodium thiosulfate and iodine). Thermal gravimetric analysis showed a sharp decomposition at 195° C. 1H NMR (300 MHz, CDC13) d 3.35 (m, 4H), 4.08 (m, 4H), 2.71 (m, 4H); nmax (KBr) 2941 (w), 2873 (w), 2153 (s).

Preparation of Benzene 1,3-disulfonyl azide:

1,3-Benzene disulfonyl azide was prepared in analogous manner as described before and yielded a white solid (20.5 g, 98%). Thermal gravimetric analysis showed a sharp decomposition at 170° C. $^1$H NMR (300 MHz, CDCl$_3$) d 8.50 (s, 1H), 8.27 (dd, J=7.6, 2.2 Hz, 2H), 7.90 (dd, J=7.6, 1.0 Hz, 1H); nmax (KBr) 3101 (w), 2142 (s).

The peroxide compound 2,5-dimethyl-2,5-di-(t-butylperoxy)-hexane has been purchased from Akzo Nobel under the commercial name "Trigonox 101".

Test Experiments Making Use of the Diazido and Peroxide Compounds

The above diazido and peroxide compounds have been tested in extruder experiments at concentrations based on polypropylene (PP) as given in Table 1. All compounds resulted in significant changes in melt rheology of the modified polymers when compared to the base polymer. Increases in melt strength, elongational viscosity and die swell together with an improved melt processability have been observed.

In the examples, the melt strength of the polymers can be measured by a so-called "haul-off" method. This method is a test method commonly used in the thermoplastic testing and can be carried out making use of a rheometer such as those manufactured by the company Rosand.

In the following, the method will be shortly explained to give a necessary understanding of its principles. The polymer to be tested is extruded or pushed by a piston through a capillary die vertically downward. The formed strand is pulled downward by a force connected to a balance recording the pulling force. This method allows to measure the melt strength of the polymer strand in a molten stage just outside the capillary die. The extruded solidified strand is hauled off by the use of a pair of nip rollers. The measured melt strength will vary with the haul-off speed. Details are given in the examples. A high "haul-off" force indicates an improved melt strength. Increasing "haul-off" force by increasing haul-off speed indicates strain hardening.

The extrudates were characterized using a Rosand RH7-2 Capillary extrusion rheometer at 190° C., with a 1 mm in diameter and 16 mm long die and an inlet angle of 90°. The cross head speed was 1 mm/min (Ca. 0.177 cm$^3$/min).

BRIEF DESCRIPTION OF THE DRAWINGS

FIG. 1 shows the results from haul-off tests;
FIG. 2 shows the results from haul-off tests.

As it can be taken from the results from haul-off tests shown in FIGS. 1 and 2, a higher amount of azido compound added results in a greater force and a lower haul-off rate before fracture, whereas addition of a peroxide provides complementarily the opposite effect.

Reference Foams

Reference foams were produced using Borealis HB120J powder with no additives, or with adding either the aforementioned azido compound or peroxide compound only.

The reference foam with no additives provided a string having a diameter of 3 mm and an approximate density of 350 kg/m$^3$. The string collapsed very rapidly after the die and gas was seen to bubble from the string in the water cooling bath. These effects were even more obvious when using a polymer melt with the peroxide compound 2,5-dimethyl-2,5-di-(t-butylperoxy)-hexane solely added.

Due to the occurrence of multiple chain scissions, a decrease in the melt viscosity was observed. In contrast to that finding, the polymer having incorporated solely the azido compound, e.g. 400 ppm, resulted in a string having a diameter of 12 mm and a density of 23 kg/m$^3$. There was no apparent collapse of the string after the extruder die and there was no leakage of gas from the string in the cooling bath. However, in presence of 200 ppm of 2,5-dimethyl-2,5-di-(t-butylperoxy)-hexane in addition to the afore-mentioned azido compound, a polymer melt resulted, which has the same superior melt strength properties as described before but these advantages are accompanied by an improved melt processability due to the controlled chain scissions by the peroxide compound as it complimented the crosslinking reaction by the azido compound.

TABLE 1

| Code | Trigonox 101 | Aromatic di-azido crosslinker |
|---|---|---|
| XL 040 | 400 ppm | 0 ppm |
| XL 041 | 400 ppm | 400 ppm |
| XL 042 | 200 ppm | 0 ppm |
| XL 043 | 200 ppm | 400 ppm |
| XL 044 | 100 ppm | 0 ppm |
| XL 045 | 100 ppm | 400 ppm |

TABLE 1-continued

| Code | Trigonox 101 | Aromatic di-azido crosslinker |
|---|---|---|
| XL 020 | 0 ppm | 0 ppm |
| XL 024 | 0 ppm | 400 ppm |

The invention claimed is:

1. An extrudate which is obtained by the process consisting essentially of the steps of:
   (a) adding a diazido compound of the formula (I)

N=N=N—X—R—X—N=N=N    (I), wherein R represents an aryl, alkyl or aralkyl group having 4 to 20 carbon atoms and X stands for —CO—, —O—CO—, —SO$_2$—, —PO$_2$— or —Si(=O)—; and
   a peroxide compound of the general formula (II)

R$_1$—X$_1$—OO—X$_2$—R$_2$    (II)

wherein R$_1$ and R$_2$ are the same or different and represent hydrogen, an aryl, alkyl or aralkyl group having 3 to 20 carbon atoms and optionally comprising further peroxide groups, wherein one of R$_1$ and R$_2$ is not hydrogen and wherein R$_1$ and R$_2$ can form a ring, and X$_1$ X$_2$ are the same or different and stand for a direct bond, —CO$_2$—, or —CO—,
   to a polyolefin,
   the ratio of the diazido compound to the peroxide compound, wherein the diazido compound and the peroxide compound are expressed in ppm relative to the polyolefin, is within the range of 1.0 to 4.0;
   (b) mixing the components of step (a) to obtain a mixture;
   (c) extruding the mixture obtained in step (b) in an extruder at a temperature above the decomposition temperature of the diazido compound of formula (I) and above the decomposition temperature of the peroxide compound of formula (II).

2. A process for preparing cross-linked polyolefins having an improved melt strength and melt processability, comprising the steps of:
   (a) adding a diazido compound of the formula (I)

N=N=N—X—R—X—N=N=N    (I), wherein R represents an aryl, alkyl or aralkyl group having 4 to 20 carbon atoms and X stands for —CO—, —O—CO—, —SO$_2$—, —PO$_2$— or —Si(=O)—; and
   a peroxide compound of the general formula (II)

R$_1$—X$_1$—OO—X$_2$—R$_2$    (II)

wherein R$_1$ and R$_2$ are the same or different and represent hydrogen, an aryl, alkyl or aralkyl group having 3 to 20 carbon atoms and optionally comprising further peroxide groups, wherein one of R$_1$ and R$_2$ is not hydrogen and wherein R$_1$ and R$_2$ can form a ring, and X$_1$ and X$_2$ are the same or different and stand for a direct bond, —CO$_2$—, or —CO—,
   to a polyolefin,
   the ratio of the diazido compound to the peroxide compound, wherein the diazido compound and the peroxide compound are expressed in ppm relative to the polyolefin, is within the range of 1.0 to 4.0;
   (b) mixing the components of step (a) to obtain a mixture;
   (c) extruding the mixture obtained in step (b) in an extruder at a temperature above the decomposition temperature of the diazido compound of formula (I)

and above the decomposition temperature of the peroxide compound of formula (II).

3. The process according to claim 2, wherein the mixture obtained in step (a) is extruded in the presence of a chemical and/or physical blowing agent.

4. The process according to claim 2, wherein the mixture obtained in step (a) is extruded in the presence of an aliphatic organic solvent selected from propane, n-butane, n-pentane, n-hexane, branched isomers or any mixtures thereof.

5. The process according to claim 2, wherein the diazido compound is of the formula (I)

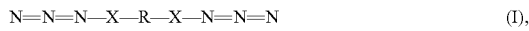

$$N=N=N-X-R-X-N=N=N \qquad (I),$$

wherein R represents $-(CH_2)_n-R_1-(CH_2)_n-$ in which $R_1$ represents an aryl or polyaryl, wherein the aryl can also be substituted by a branched or linear C1 to C6 alkyl, or $(CH_2)_w$ group, w being 4 to 6, and in which n is 0, 1, or 2 and wherein X stands for $-SO_2-$, $-O-CO-$, or $-CO-$.

6. The process according to claim 2, wherein, in formula (I), X stands for $-SO_2-$.

7. The process according to claim 2, wherein the diazido compound is $N_3-SO_2-R_2-SO_2-N_3$, wherein $R_2$ represents an aryl group or an alkyl group having 4 to 8 carbon atoms.

8. The process according to claim 2, wherein the diazido compound is 1,6-di(sulfonazido)-hexane or 1,3-di (sulfonazido)-benzene.

9. The process according to claim 2, wherein the diazido compound is used in an amount of 5 to 25,000 ppm related to the amount of the polyolefin.

10. The process according to claim 2 wherein the peroxide compound is of the general formula (II)

$$R_1-X_1-OO-X_2-R_2 \qquad (II)$$

wherein $R_1$ and $R_2$ are the same or different and represent hydrogen, an aryl, alkyl or aralkyl group having 3 to 20 carbon atoms and optionally comprising further peroxide groups, wherein one of $R_1$ and $R_2$ is not hydrogen and wherein $R_1$ and $R_2$ can form a ring, and wherein $X_1$ and $X_2$ are the same or different and stand for a direct bond, $-CO_2-$ or $-CO-$.

11. The process according to claim 10, wherein the peroxide compound is 2,5-dimethyl-2,5-di-(t-butylperoxy)-hexane.

12. The process according to claim 2, wherein the peroxide compound is used in an amount of 5 to 10,000 ppm related to the amount of the polyolefin.

13. The process according to claim 2, wherein the polyolefin is polypropylene, polyethylene, a copolymer or a mixture thereof.

14. The process according to claim 3, wherein the mixture obtained in step (a) is extruded in the presence of an aliphatic organic solvent having 3 to 10 carbon atoms.

15. The process according to claim 14, wherein the aliphatic organic solvent has 3 to 8 carbon atoms.

16. The process according to claim 9, wherein the diazido compound is used in an amount of 10 to 10,000 ppm related to the amount of the polyolefin.

17. The process according to claim 16, wherein the diazido compound is used in an amount of 25 to 5,000 ppm related to the amount of the polyolefin.

18. The process according to claim 17, wherein the diazido compound is used in an amount of over 50 to 800 ppm related to the amount of the polyolefin.

19. The process according to claim 18, wherein the diazido compound is used in an amount of 100 to 400 ppm related to the amount of the polyolefin.

20. The process according to claim 12, wherein the peroxide compound is used in an amount of 25 to 5,000 ppm related to the amount of polyolefin.

21. The process according to claim 20, wherein the peroxide compound is used in an amount of 25 to 1,000 ppm related to the amount of polyolefin.

22. A method of preparing a shaped or molded article, the method comprising
(a) adding a diazido compound of the formula (I)

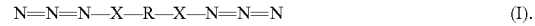

$$N=N=N-X-R-X-N=N=N \qquad (I).$$

wherein R represents an aryl, alkyl or aralkyl group having 4 to 20 carbon atoms and X stands for $-CO-$, $-O-CO-$, $-SO_2-$, $-PO_2-$ or $-Si(=O)-$; and a peroxide compound of the general formula (II)

$$R_1-X_1-OO-X_2-R_2 \qquad (II)$$

wherein $R_1$ and $R_2$ are the same or different and represent hydrogen, an aryl, alkyl or aralkyl group having 3 to 20 carbon atoms and optionally comprising further peroxide groups, wherein one of $R_1$ and $R_2$ is not hydrogen and wherein $R_1$ and $R_2$ can form a ring, and $X_1$ and $X_2$ are the same or different and stand for a direct bond, $-CO_2-$, or $-CO-$, to a polyolefin, the ratio of the diazido compound to the peroxide compound, wherein the diazido compound and the peroxide compound are expressed in ppm relative to the polyolefin, is within the range of 1.0 to 4.0;

(b) mixing the components of step (a) to obtain a mixture;

(c) extruding the mixture obtained in step (b) in an extruder at a temperature above the decomposition temperature of the diazido compound of formula (I) and above the decomposition temperature of the peroxide compound of formula (II), (d) blow molding the extrudate of step (c) to form the desired shape.

23. A method according to claim 22, wherein the shaped or molded article is an article for an automotive part and/or packaging.

24. A method of increasing the melt strength of polymers comprising combining a diazido compound of the formula (I)

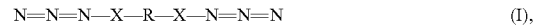

$$N=N=N-X-R-X-N=N=N \qquad (I),$$

wherein R represents an aryl, alkyl or aralkyl group having 3 to 20 carbon atoms and X stands for $-CO-$, $-SO_2-$, $-PO_2-$ or $-Si(=O)-$, and and a peroxide compound of the general formula (II)

$$R_1-X_1-OO-X_2-R_2 \qquad (II)$$

wherein $R_1$ and $R_2$ are the same or different and represent hydrogen, an aryl, alkyl or aralkyl group having 3 to 20 carbon atoms and optionally comprising further peroxide groups, wherein one of $R_1$ and $R_2$ is not hydrogen and wherein $R_1$ and $R_2$ can form a ring, and $X_1$ and $X_2$ are the same or different and stand for a direct bond, $-CO_2-$ or $-CO-$, (b) mixing the components of step (a) to obtain a mixture;

(c) extruding the mixture obtained in step (b) in an extruder at a temperature above the decomposition temperature of the diazido compound of formula (I)

and above the decomposition temperature of the peroxide compound of formula (II).

25. A method according to claim 24 for improving the melt processability of polymers.

26. A method according to either claim 24 or 25 wherein the ratio of the diazido compound to the peroxide compound is within the range 1.0 to 4.0.

27. A method according to claim 24, wherein the polymer is a polyolefin.

28. A method according to claim 25, wherein the polymer is a polyolefin.

29. A method according to either claim 27 or 28, wherein the polyolefin is a polypropylene, polyethylene, a copolymer or a mixture thereof.

* * * * *